US012043756B2

(12) United States Patent
Fishel et al.

(10) Patent No.: US 12,043,756 B2
(45) Date of Patent: Jul. 23, 2024

(54) ELECTRON BEAM IRRADIATION PROCESS AND POLYMERIZABLE STAIN APPLIED TO WOOD PLANKING

(71) Applicant: Bond Distributing, Ltd., Eastlake, OH (US)

(72) Inventors: Scott Fishel, Concord, OH (US); Connor Fishel, Willoughby, OH (US); Paul Smith, Mentor, OH (US)

(73) Assignee: Bond Distributing, Ltd., Eastlake, OH (US)

( * ) Notice: Subject to any disclaimer, the term of this patent is extended or adjusted under 35 U.S.C. 154(b) by 67 days.

(21) Appl. No.: 17/713,404

(22) Filed: Apr. 5, 2022

(65) Prior Publication Data

US 2022/0243069 A1 Aug. 4, 2022

Related U.S. Application Data

(63) Continuation-in-part of application No. 17/558,433, filed on Dec. 21, 2021, now abandoned, which is a continuation of application No. 16/792,656, filed on Feb. 17, 2020, now Pat. No. 11,203,700, which is a continuation of application No. 15/581,065, filed on Apr. 28, 2017, now Pat. No. 10,563,083.

(51) Int. Cl.
| | |
|---|---|
| *C09D 4/00* | (2006.01) |
| *B27K 3/02* | (2006.01) |
| *B27K 3/15* | (2006.01) |
| *B27K 3/52* | (2006.01) |
| *B27K 5/02* | (2006.01) |
| *C08F 2/46* | (2006.01) |
| *C08F 2/50* | (2006.01) |
| *C08G 61/04* | (2006.01) |
| *C09D 135/02* | (2006.01) |
| *B05D 3/06* | (2006.01) |

(52) U.S. Cl.
CPC .............. *C09D 4/00* (2013.01); *B27K 3/0207* (2013.01); *B27K 3/15* (2013.01); *B27K 3/52* (2013.01); *B27K 5/02* (2013.01); *C09D 135/02* (2013.01); *B05D 3/067* (2013.01); *B05D 2203/20* (2013.01); *B27K 2240/70* (2013.01); *B27K 2240/90* (2013.01)

(58) Field of Classification Search
CPC .......... B27K 5/02; B27K 3/0207; B27K 3/52; B27K 3/15; B27K 2240/90; B27K 2240/70; C08F 222/103; C08F 222/102; C08F 222/1065; C08F 230/08; C08F 230/1811; C09D 135/02; C09D 4/00; B05D 3/067; B05D 3/068; B05D 7/06; B05D 2203/20
USPC ........ 427/177; 522/6, 189, 184, 71, 1; 520/1
See application file for complete search history.

(56) References Cited

U.S. PATENT DOCUMENTS

| | | |
|---|---|---|
| 4,282,269 A | 8/1981 | Lucey |
| 4,415,603 A | 11/1983 | Valiot et al. |
| 4,537,822 A | 8/1985 | Nanri et al. |
| 4,600,649 A | 7/1986 | Leo |
| 5,128,387 A | 7/1992 | Shustack |
| 5,213,875 A | 5/1993 | Su et al. |
| 5,453,451 A | 9/1995 | Sokol |
| 5,521,266 A | 5/1996 | Lau |
| 5,571,570 A | 11/1996 | Lake |
| 5,773,487 A | 6/1998 | Sokol |
| 6,040,409 A | 3/2000 | Lau et al. |
| 6,187,387 B1 | 2/2001 | Bolle et al. |
| 6,583,195 B2 | 6/2003 | Sokol |
| 6,664,327 B2 | 12/2003 | Daisey, Jr. et al. |
| 6,677,000 B2 | 1/2004 | Neuhaus-Steinmetz et al. |
| 6,835,327 B2 | 12/2004 | Behling |
| 7,005,002 B2 | 2/2006 | Glockner et al. |
| 8,580,894 B2 | 11/2013 | Palushaj et al. |
| 10,563,083 B2 | 2/2020 | Fishel et al. |
| 2007/0197384 A1 | 8/2007 | Yan |
| 2011/0071251 A1 | 3/2011 | Dana et al. |

FOREIGN PATENT DOCUMENTS

| | | | |
|---|---|---|---|
| CN | 109651934 | * | 4/2019 |
| CN | 109651934 A | | 4/2019 |
| JP | 11279442 | * | 10/1999 |

OTHER PUBLICATIONS

Watanabe, JP 11-279442 Machine Translation, Oct. 12, 1999 (Year: 1999).*

(Continued)

*Primary Examiner* — Jessica Whiteley

(74) *Attorney, Agent, or Firm* — Eschweiler & Potashnik, LLC

(57) ABSTRACT

A process utilizes electron beam generated ionizing radiation or low energy electron irradiation to effect cure of polymerizable stain compositions applied to wood planking. The electron beam ionization process generates sufficient energy to break bonds and generate new cross-links within the polymeric stain composition thus bonding the stain strongly within the pores and surface of the wood planks further creating a durable treatment. The electron beam ionization process simplifies the curing process by eliminating or reducing the need for expensive photoinitiators. Pre-stained wood planking is suitable for exterior decking materials and building panels requiring a combination of color affected and durable finishes, thereby eliminating the need for field installation of pretreatments, stains, coatings and the like. These electron beam cured wood planks take on an assortment of appearances including clear, natural, translucent, and solid hues.

20 Claims, 2 Drawing Sheets

(56) References Cited

OTHER PUBLICATIONS

Laie et al., CN 1096581934 Machine Translation, Apr. 19, 2019 (Year: 2019).*
"Restriction Requirement for U.S. Appl. No. 15/581,065", Mailed Date: Mar. 28, 2019, 6 pages.
"Non-Final Office Action for U.S. Appl. No. 15/581,065", Mailed Date: Jun. 24, 2019, 8 pages.
"Notice of Allowance and Fees Due for U.S. Appl. No. 15/581,065", Mailed Date: Oct. 9, 2019, 11 pages.
Non-Final Office Action dated Feb. 8, 2021 for U.S. Appl. No. 16/792,656.
Final Office Action dated Jun. 2, 2021 for U.S. Appl. No. 16/792,656.
Notice of Allowance dated Aug. 13, 2021 for U.S. Appl. No. 16/792,656.
HGExperts.com "An Introduction to Ultraviolet Light (UV) and Electron Beam (EB) Curable Coating Technology." Retrieved on Apr. 12, 2022 from https://www.hgexperts.com/expert-witness-articles/an-introduction-to-ultraviolet-light-uv-and-electron-beam-eb-curable-coating-technology-5003.
Davidson, Stephen. "Exploring the Science, Technology and Applications of U.V. and E.B. Curing." SITA Technology Limited, London UK. Published in 1999.

* cited by examiner

ELECTRON BEAM IRRADIATION PROCESS AND POLYMERIZABLE STAIN APPLIED TO WOOD PLANKING

CROSS-REFERENCE TO RELATED APPLICATION

This application is a continuation-in-part of U.S. application Ser. No. 17/558,433, filed on Dec. 21, 2021, which, in turn, was a continuation of U.S. application Ser. No. 16/792,656, filed Feb. 17, 2020, published as U.S. Pat. No. 11,203,700 on Jun. 11, 2020, and issued as, which, in turn, is a continuation of U.S. application Ser. No. 15/581,065, filed Apr. 28, 2017, published as U.S. 2018/0312714 on Nov. 1, 2018, and issued as U.S. Pat. No. 10,563,083, on Feb. 18, 2020. These prior applications are herein incorporated by reference.

FIELD

The present disclosure pertains to processes and compositions that are particularly suited to the treatment, penetration, protection, and enhancement of wood substrates and may also include modifying and augmenting the color of said substrates. More particularly, the present disclosure concerns reactive polymeric stains applied to wood and subsequent application of electron beam irradiation to facilitate full cure and bonding of the stain on or within the pores of the treated wood.

BACKGROUND

Currently, wood deck stains are comprised of resinous, film-forming coatings which lay mostly on the surface of wood to create a protective barrier to weathering, physical wear, and UV degradation. These coatings have traditionally been based on alkyd enamels, acrylic, and urethane resin-lacquer technology. More recently, water-based versions of these technologies have become common. These resinous approaches do not penetrate deep into the wood, rather, they lay mostly on the surface of the wood forming a resinous film where they are prone to blistering, peeling, and flaking. This limits their durability significantly. The focus has been to improve upon the UV stability of resinous film-forming coatings, but lack of deep penetration and stabilization and curing of the coatings into the wood substrate has thwarted performance improvements to long-term durability.

The average homeowner will spend thousands of dollars installing and maintaining exterior structures. In particular, the treatment, beautification, and protection of exterior structures, including, but not limited to wooden decks, wooden siding, wooden shutters, wooden shingles, wooden flooring and laminates, synthetic decking, and synthetic wood is not only desirable from an aesthetic point of view, but is necessary to ward off damage imparted to wood and other porous or even non-porous substrates from exposure to physical, biological, and chemical attacks.

It is well known through investigative studies performed by the United States Department of Agriculture's Forestry Products Division (USDA FP Div.) that exterior wooden surfaces are composed of structurally dynamic materials which react directly to the immediate surrounding environment. These structurally dynamic materials have been identified to be the most significant factor contributing to the failure of film-forming exterior paints/coatings/stains on exterior wooden surfaces. Simply stated, exterior wood expands and contracts in reaction to changes in humidity and temperature, making long term adhesion of currently available protective film-forming finishes difficult, if not impossible.

Furthermore, exposed (untreated) exterior wooden structures are susceptible to rot and/or discoloration. This discoloration is typically caused by fungal infection, bacterial infection, water and/or UV damage from natural sunlight, and is aggravated by damage caused by seasonal and daily temperature changes. If a fungus or fungi does not infest the substrate, it may, at the least, cause discoloration. Contributing factors to exterior wood discoloration include: (1) fungal infestation of porous surface and sub-surface structures, (2) potential fungal/bacterial digestive damage on the wood itself, and (3) UV damage to the wooden surface which, with rain, water, and snow, may wash away surface layers of wood, thus exposing further wood to UV damage and renewing fungal nutrients and favorable conditions for fungal infestation.

Wood is comprised of three primary 'building block' materials: lignin, cellulose, and hemicellulose. Research results from the USDA FP Div. report that the lignin and related phenolic resin components of wood are most susceptible to UV damage due to chromophore absorbance of UV light. Lignin acts as the primary binder that maintains the structural integrity of wood. UV damage of lignin causes discoloration and the eventual erosion of wood cells and fiber thereof. Polyphenolic compounds cause the lignin matrix to "break down" and be removed by the leaching action of water.

USDA investigation has also revealed that solvents and water components used in wood sealers, preservatives, and stains cause specific structures in wood that control water transport to inhibit the penetration of wood sealers, preservatives, and stains into the wood. These structures effectively act as 'valves' that open and close to control the flow of sap and water from the roots to the leaves in trees. These 'valves' have been shown by the USDA to still be responsive to water and solvents well after the harvesting and processing of the tree. The continued activity of these liquid-transport, controlling structures contributes to the dynamic nature of wood in direct response to ambient temperature and humidity levels.

To address the dynamic nature of wood, both the treatment applied to it and the how it reacts with the wood and itself is important. A composition applied to wood also needs to be properly cured (reacted) to be effective. Various challenges exist in achieving a proper cure, especially in outdoor or other environments that are difficult to control.

Heretofore, the treatment of wood, that is, the application of a stain, coating, or paint, to wood is accomplished by the manual application, from a roller pan containing a reservoir of various types of coatings. The roller is typically fitted with a fiber sleeve used to dip and apply the absorbed liquid coating onto the surface of the wood planks. Field application most frequently employs rollers fastened to extension poles, but other techniques such as brush, micro-fiber, knife edge, cloth and low-pressure spray or airless spray have all been used.

Most frequently, solvent-based and more recently water-based coatings are utilized, which have high levels of solvent and water that must evaporate from the applied film before reasonably good film formation can take place. These types of coatings are problematic to install and cure unpredictably as environmental conditions frequently interfere with proper drying and film formation. For instance, high or low temperatures, precipitation, high humidity, winds, direct sun light, etc. can cause the coatings to either not form into a continuous film or at the very least display cosmetic imperfections. All of these factors can result in significant loss of absorption and adhesion dramatically affecting long term durability. Color uniformity and overall aesthetic value are often sacrificed leading to unsightly appearance.

Numerous prior disclosures covering the composition and curing mechanisms of solvent-based and water-based stains to wood decks are available. However, the prior art teaches stains and coatings that are known to produce a thinly applied surface film which is limited to the uppermost top surface of the wood. Essentially these prior-art stains and coatings are therefore topical in nature and subject to rapid loss of film integrity and decreasing color enhancement. This brings about the further loss of resistance to weathering and microbiological attack at the interface between the film and the wood surface ultimately leading to erosion, blistering, flaking, peeling, and generalized failure of the stain or coating and accelerated deterioration of the wood.

For instance, certain prior art claims good exterior durability is obtained by use of a solution polymerized resin which is then post emulsified into water. Other teachings detail the use of aqueous hydrophobic emulsion lattices that cure by coalescence of the latex particles to produce semi-translucent stains applied to wood decks. These stain compositions are applied in the field and attempt to provide a durable treatment for wood decks, but fall short as measured by a limited number of years of service prior to displaying wear patterns and decay of the surface film, thus necessitating reapplication.

EB curing of paper goods including clay-treated paper using an offset gravure process has been disclosed, where a low energy electron beam is employed to facilitate curing via an EB curtain apparatus. Other art teaches that rough and irregular surfaces can be rendered smooth by application of electron beam irradiation. All of these compositions reference viscosities in the range from 500 to 5,000 centipoise and are well suited for treating paper goods and the like. However, those skilled in the art will recognize that these previous compositions will fail to penetrate a dense material to any substantial depth and therefore is not suitable for wood planking.

SUMMARY

In contrast to the prior usages of EB curing on surfaces, the composition and process disclosed herein employs a low viscosity polymeric stain that penetrates wood planking to a substantial depth and is rendered essentially 100 percent cured when low energy electron beams irradiate the treated wood planking. The proper dose of EB irradiation disclosed herein facilitates a full depth cure of the polymeric stain and promotes strong bonds being established within the pores of the wood planking.

In an embodiment disclosed herein, a method for producing a cured wood plank, comprises: applying a composition to a surface of the wood plank, the composition comprising a polymerizable oligomer, monomer, or both; irradiating the surface of the wood plank with the composition with ionizing radiation sufficient to polymerize the polymerizable oligomer or monomer, thereby curing the wood plank and composition. The ionizing radiation being applied by an electron beam. For the avoidance of doubt, the terminology "comprises . . . irradiating the surface of the wood plank" above and in the claims includes irradiating other portions of wood as well. A feature disclosed herein is the deep penetration of ionizing irradiation, such as EB curing.

In an embodiment, a composition for application to a wood plank comprises: a polymerizable oligomer or monomer, or both; wherein the composition has a dynamic viscosity of 100 to 500 centipoise as measured by ASTM D2196; and the composition is free of or essentially free of any photoinitiators.

In an embodiment, a method of curing a composition applied to wood includes: applying a composition to a surface of the wood, the composition comprising: an acrylate-methacrylate mixture, the acrylate-methacrylate mixture comprising at least an acrylate oligomer and at least a methacrylate oligomer, the acrylate oligomer having a lower molecular weight than the methacrylate oligomer. Then method further comprises curing the composition on the wood surface with an electron beam.

In another embodiment disclosed herein, a sealant composition is an essentially 100% solids, UV curable, single-component, low-viscosity penetrating wood protector which may be applied to wood and porous or non-porous substrates by various methods and tools. In an embodiment described herein, the sealant composition comprises: (a) an acrylate-methacrylate mixture that can undergo polymerization, the acrylate-methacrylate mixture comprising at least an acrylate and at least a methacrylate, the acrylate having a lower molecular weight than the methacrylate, wherein the methacrylate contains allyl or other conjugated unsaturation and multi-functionality for improved surface cure; (b) a functionalized resin having functionality greater than 2 and a dynamic (shear) viscosity of between 1,000 to 100,000 centipoise, such as an oligomeric (meth)acrylate functionalized urethane, polyester, epoxy, or siloxane; (c) an unsaturated fatty acid triglyceride oil capable of entering into a free-radical initiated polymerization; and (d) a mixture of organic and/or inorganic photoinitiators which initiates the polymerization reaction upon exposure of the sealant composition to UV light or electron beam. The sealant composition may further comprise: (e) a metal catalyst; (f) an amine synergist; (g) ultraviolet light absorbers and hindered amine light stabilizers (HALS) for enhanced durability; (h) a blend of fillers, pigments, and/or dyes for imparting special colors to the sealant composition; and (i) specialized organic or inorganic additives, such as fungicides, mold growth inhibitors, insect replants, flow and leveling agents, defoamers, and/or fragrance.

Given the near total absence of water and solvents in the sealant composition, its low viscosity enables it to permeate through wood without triggering liquid transport controlling or impeding structures. Thus, the composition's low viscosity is beneficial to deep penetration and partitioning within the wood to various layers. The low viscosity is a characteristic of the selection of (meth)acrylates, oligomers, and unsaturated fatty acid triglyceride oils and their relative weight ratios with respect to one another. Thus, in an embodiment, the sealant composition provides deeper penetration and correspondingly deeper protection, which is especially beneficial when function-specific adjuvants, i.e., fungicide, UV absorber, HALS, in-can stabilizers, and insect repellents are incorporated.

The EB cured stain composition is particularly useful not only in treating wooden deck materials, pressure treated wood articles, residential and commercial wooden siding, window frames, doors, trim, flooring, fences, and roof tiles, but also laminates which have been made from wood chips, monolithic wood substitutes, and other natural porous materials produced by a manufacturing process with the end-use application being of the aforementioned items in building construction.

DETAILED DESCRIPTION

Figure 1:
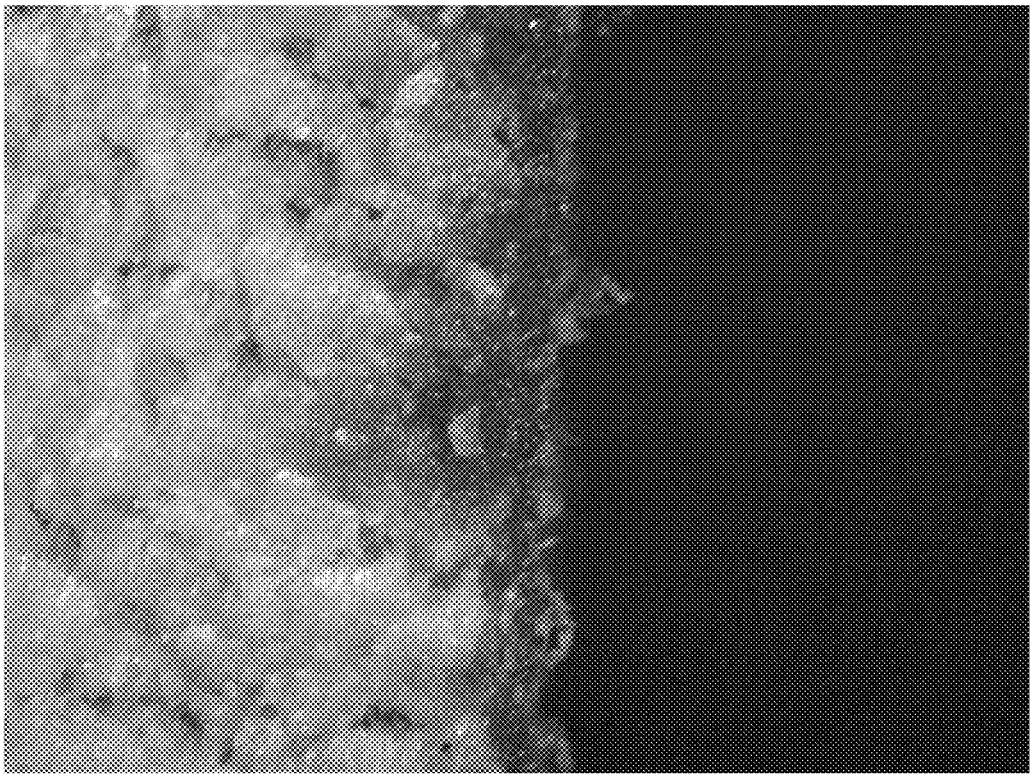
FIG. 1 is a 200× microscopic view of a cross-section showing a wood plank treated with Example 7 (clove brown pigment).

Disclosed herein are processes for coating and staining wood planking and auxiliary building panels which find use in the prestained deck market. The term "wood planking" or "wood planks" is used to distinguish from paper or other non-rigid wood or lignin containing materials. Specifically, wood planks of dimensions suitable for constructing floor planks, railings, steps, spindles, shakes and the like are coated and cured to produce a strongly bonded treatment within the pores of the wood planks and impart colors visible at the top surface.

In an embodiment, the present invention pertains to the application of reactive polymeric stains to exterior wood planks and subsequent application of electron beam irradiation to facilitate full cure and bonding of the stain within the pores of the treated wood planks. The electron beam process conveys rapid cure to the polymeric stain while maintaining low substrate temperatures at high throughput and employing moderate radiation dosage thus reducing environmental impact.

The wood planks treated using this low energy electron beam ionization process and polymerizable stain composition effectively enhances durability and longevity from external exposures such as natural weathering phenomenon, water infiltration, oxidation processes, insect damage, mold growth, pigment leaching, abrasive actions and chemical exposure such as acid rain, cleaning chemicals and disinfectants employed for cleansing.

In an embodiment, the wood planks can be selected from various species of wood and lumber sources. Examples of commonly employed species of wood used for planking include pine, cedar, oak, spruce, and maple. The wood planking may receive a pretreatment for outdoor drying conditions prior to application of a polymerizable stain. Pretreatments have the main purpose of protecting the wood from rot brought about by extended exposures to rain, snow, and mold, mildew or fungal attack as well as warpage due to prolonged drying spells after heavy exposure to precipitation. Pretreated woods present no inhibition to successful treatment and subsequent EB irradiation and curing of polymerizable stains.

Further, the permanence of the wood planks wearing surface including its surface aesthetics and hue are enhanced by the process disclosed herein due to the near 100 percent degree of cross-linking within the polymerizable stain supplied from a dose of electron beam ionizing radiation. Lab tests performed on polymerized stained wood planks demonstrate excellent performance properties in terms of hardness, abrasion resistance, chemical spot tests, rub-offs, and accelerated weathering. Thermal analysis employing differential scanning calorimetry (DSC) can also be used to confirm that essentially 100 percent crosslinking has been achieved in the full depth of the stain.

In an embodiment, a process for irradiating a low viscosity, polymerizable stain applied to wood planks and crosslinked by means of electron beam irradiation is disclosed herein. The polymerizable stain is first applied to the wood planks using techniques including, but not limited to, roller coat, knife blade, or airless spray on to the surface of the wood planks. The stain composition can also be applied by tools such as a paint roller, brush, Lamb's wool or synthetic microfiber applicator, sprayer, and in the case of in-plant usage, a wide variety of automated applicators such as knife blades, roll coater, dipping, or other automated applicators.

In an embodiment, the stain composition, when applied on a wood surface, forms a layer on top of the wood surface with a thickness of from 0.001 to 50 µm. For example, the layer on top of the wood surface may have a thickness of from 0.1 to 25 µm, from 1 to 15 µm, or from 7 to 20 µm. Over time the stain is further absorbed into the interstices of the wood planks; thus assessment of the coat thickness being in these ranges should be done within 3 seconds of application.

Subsequently (e.g., within 1 minute, 30 seconds, or 5 seconds, such as, as soon as the conveyor line moves the wood to the EB treatment station), irradiation with low energy electron beams is carried out to facilitate crosslinking and rapid cure. In another embodiment, the substrate can be treated with the composition and stored for a longer period, such as, for example, up to day before EB curing, e.g., 1 hour to 8 hours, 2 hours to 6 hours, or 3 hours to 5 hours. In an embodiment, multiple applications of a polymerizable stain, e.g., two to five, or three to four, will be applied, each receiving appropriate cure before application of a subsequent layer to protect from migration of colors. In particular, treating and allowing time cure a first color layer would occur to prior applying a clear top layer. Typically, the cure of each layer would be by EB irradiation, but in some embodiments, a layer could be cured by another method, e.g., light (UV), heat, and/or or air.

After treatment the wood and stain are essentially fully cured and can be touched without damaging the surface. Thus, in an embodiment of the process described herein, the wood planks can be stained, cured, and packaged for delivery in short order. Thus, greatly enhancing manufacturing capacity and efficiency.

The EB irradiation process activates the monomeric or oligomeric components by, for example, causing cleavage of electronegative pi-bonds. Additionally, sigma carbon-carbon bond scission of alkanes ionizes, forming cation radicals, which further undergo decomposition to hydrogen atoms and carbon-centered radicals. Ether groups give rise to α-alkoxyalkyl radicals. These radicals bond to the lignin or other polymeric compounds in the wood surface.

Oxygen is known to scavenge free radicals thus reducing radical efficiency. Oxygen inhibition will deleteriously affect initiation of cure of the polymerizable stain especially at the exposed surface. For this reason, the gap between the electron source and the polymerizable stain can be flushed with an inert gas, such as nitrogen, so that the passage of electrons and subsequent free radical generation is not diminished.

Electron beam irradiation is used advantageously to crosslink polymerizable stain disclosed herein during very short exposure times allowing for increased production throughput on conveyor line processes. The depth-wise distribution of the absorbed radiation dose, can be calculated for any given acceleration voltage. The Dose Rate is the rate at which energy is absorbed and is expressed as Megarads per second, Mrad/s or Mrad/min. The dose can also be expressed in kilogray, kGy. Since 1-Mrad equals 10 joules per gram and 1-kGy equals 1 joule per gram, then 10 kGy corresponds to 1 Mrad of energy absorbed. Further, the total irradiation dose is equal to the Dose Rate (rate of energy absorption) divided by the Conveyor Line Speed, and Dose Rate is directly proportional to the Beam Current. Beam Current is measured in amps (A) or milliamps (mA). In an embodiment, an electron beam curtain apparatus for use in the process disclosed herein, runs at a Dose Rate of 20 microamps to 20 milliamps, such as, for example, 100 microamps to 10 milliamps, or 500 microamps to 1 milliamp.

Adjusting dose rate and electron beam acceleration voltage allows the tailoring of the total irradiation and controls the rate at which the polymerizable stain cures. At the same time, controlling the ionizing dose must be balanced to reduce or eliminate damage imparted to the cellulosic structure of the wood planks. Balancing dose rate within acceptable limits maximizes crosslink density by promoting essentially 100 percent cure. Essentially, attainment of 100 percent cure is interrelated to the measure of the physical strength of the bonds established within the cellulosic structure of the wood planks and equates to improved durability and longevity of the stained wood planks. Durability is frequently measured by means of accelerated weathering protocols; specifically, measuring the polymerizable stain's resistance to oxidative damage by means of the Q-Lab QUV condensing humidity chamber that produces accelerated weathering tests at an irradiance of 0.89 W/m2/min can be most instructive.

In an embodiment, the process is performed with a low energy electron beam that will be attained by employing an EB electrocurtain unit equipped with one filament or multifilament head. The EB electrocurtain is utilized in combination with a process for application of polymerizable stain onto wood planks. The planks may travel on a unified conveyor system to first coat the planks and then pass through the EB electrocurtain unit for curing a specific rate of throughput. In an embodiment, the processes may be separately conducted.

Attainment of essentially 100 percent crosslinking of the polymerizable stain within the wood planks is desired, such as, for example, at least 97%, such as 98% to 99.99%, 98.5% to 99.9%, or 99% to 99.5% cure. These levels of cure are attainable immediately after undergoing the ionizing radiation, e.g., after exiting the electron beam irradiation apparatus. In stark contrast to the hours and days of cure required by conventional curing stains, this is achievable with only seconds of EB curing. It has been determined that setting the acceleration voltage of the electron beam of 50 kV to 350 kV transmits a dose of 5 kGy to 100 kGy, such as 6 to 40 kGy, or 7 to 12 kGy. The electron beam acceleration voltage can also be 80 kV to 300 kV, or 150 kV and 250 kV.

The transmission of the appropriate dose can be delivered in a single pass or via multiple passes. The number of coats and cure cycles will depend on how many applications of polymerizable stain are required to achieve a specific color affect. A second coat of stain will be cured with a second dose of EB radiation. The second dose of EB radiation will not harm the first coat, but rather will help to ensure full cure of the first coat of stain A rate of conveyance of the stained wood planks or stained panels through the process will achieve a line speed of 10 and 300 m/min, such as 150 to 250 m/min, or 200 to 225 m/min. Faster line speeds may be desirable for increased production. The faster the line speed, the higher the dose rate needs to be set for, since exposure time is reduced. In an embodiment, the dose rate, line speed, and beam current are configured to achieve a dose rate from 6 kGy to 12 kGy per pass, and totaling not more than 24 kGy.

In an embodiment, the polymerizable stain is a composition comprised of a selection of a combination of the following components: oligomers, monomers, diluents, pigments, UV absorbers, fungicides, and flow additives. Other enhancing ingredients can be added to promote maximum penetration into the cellulosic interstices and establish an essentially permanent bond within the wood planks. For EB irradiation to be effective, the polymerizable stain should contain at least the oligomeric or monomeric ionizable groups. The viscosity reducers, such as diluent, enable deeper penetration of the wood.

In an embodiment, the oligomers, for example, include one or more of the following chemical compounds in oligomeric form: acrylated or methacrylated urethane, polyester, siloxane, epoxide, melamine, butadiene, cellulose, dendritic species with at least one functionally reactive molecule, vinyl ethers, or cationic resins; however, these examples are not intended to restrict the type of radiation curable resin which can be used to constitute the low viscosity, polymerizable stain. In a particular embodiment, the polymerizable oligomer is an aliphatic urethane acrylate, a siliconized urethane acrylate, or both. This component can be present in an amount of 1 to 30% by weight, such as 2 to 15%, or 3 to 10% in the pre-cured composition. Oligomer as used herein, is distinguished from a monomer, in that it has multiple units of a base monomer unit bonded in a chain, which may be in a branched, linear, or star formation. A range of number average molecular weights for an oligomer may be, for example, 500 g/mol to 10,000 g/mol, such as 1,000 g/mol to 6,000 g/mol, or 2,500 g/mol to 4,500 g/mol.

In an embodiment, monomers are included which further affect viscosity control and cure response. Monomers can be mono-functional or multi-functional and include one or more of the following chemical compounds: aliphatic hydrocarbon, cycloaliphatic hydrocarbon, aromatic hydrocarbon, ethoxylate, propoxylate, acrylate and methacrylate. Further examples of monomer include those with functional moieties selected from: bicyclic, heteroatomic, multi-functional, allylic, dendritic, and metal-ligands. This component can be present in an amount of 10 to 60% by weight, such as 12% to 50%, or 15% to 40% in the pre-cured composition.

In an embodiment, diluents can, for example, include one or more of the following chemical compounds: plasticizers including phthalate esters, phosphate esters, sulfonated and ethoxylated polymers. This list is simply meant as representative of the broader class of chemicals denoted as diluents that are sometimes added to enhance viscosity reduction, increase compatibility between additives and the oligomer-monomer composition while contributing to flexibility. This component can be present in an amount of 1 to 10% by weight, such as 2 to 8%, or 3 to 6% in the pre-cured composition.

In an embodiment, the stain composition comprises a pigment and/or dye. Pigments and dyes are used to produce neutral or natural color effects in the treated wood planks to produce aesthetic qualities valued in the prestained wood deck market. The pigments may be selected, for example, from iron oxide pigments, inorganic metal-oxides, and organic soluble dyes. Inorganic metal-oxides and organic soluble dyes should be selected to produce a stable color effect when exposed to exterior daylight sun. This can be done by a Q-Lab condensing humidity chamber that produces accelerated weathering tests at an irradiance of 0.89

W/m2/min. UV absorbers and flow additives, such as Tinuvin 292 and Tinuvin 11130 may be used in the composition. For example, either of these additives may be present in an amount in an amount of 0.1% to 5%, 0.3% to 2.5%, or 0.75% to 1.5% by weight, based upon the total weight of the composition prior to being cured. When present, the pigment and/or dye may be present in an amount of from 0.01% to 40% by weight, based upon the total weight of the composition prior to being cured. For example, the pigment and/or dye may be present in an amount from 0.1% to 1%, from 2% to 4%, or from 5% to 15% by weight, based upon the total weight of the composition prior to being cured.

The stain composition may also incorporate a fungicide to inhibit fungal infestation or growth. Fungicide or combination of fungicides, organic or inorganic, that are compatible with the other components of the stain composition (compatible meaning there is no tendency towards precipitation when mixed with the stain composition at room temperature and 1 atm) may be used herein. When a fungicide is included in the stain composition, a particularly preferred fungicide is a commercially available fungicide sold under the name Proxel GXL (1,2-benzisothiazolin-3-one) by Lonza. Another fungicide that may be used is 3-iodo-2-propynyl butyl carbamate marketed by Troy Chemical Corp. under the trade name Troysan Polyphase™. Yet another fungicide that may be used is a commercially available fungicide sold under the name Buson 1498. The fungicide may be present an amount of from 0.3% to 2.0% based on the total weight of the stain composition prior to being cured. For example, the fungicide may be present in amount of from 0.4% to 0.8%, from 0.7% to 1.5%, or from 1.3% to 1.9% based on the total weight of the stain composition prior to being cured.

Because of the market demand for protection against UV damage, a UV absorber, a combination of UV blockers, or a HALS (hindered-amine light stabilizers) may be incorporated into the stain composition. Generally, the UV blocker(s) may be present in an amount ranging from 0.01% to 5% by weight, based upon the total weight of the stain composition prior to being cured. For example, the UV blocker(s) may be present in an amount of from 0.05% to 1%, from 2% to 4%, or from 2.5% to 4.5%. The 'UV blocker' is any one of the HALS or UV absorber type blockers, such as, for example: sebacate, decanedioic, propanoic, and propanoic $C_{n-9}$-branched alkyl esters; benzoxazole, oxirane compounds; hydroxyhydrocinnamantate, hydroxyhydrophosphate, and benzotriazole triazine derivatives, as well as mixtures thereof. When a HALS is included in the stain composition, it may be beneficial to employ a sebacate-containing HALS, such as Tinuvin 292 (BASF), which is a blend of 1,2,2,6,6-pentamethyl-4-piperidinol, bis(1,2,2,6,6-pentamethyl-4-piperidenyl) sebacate, and methyl (1,2,2,6,6-pentamethyl-4-piperidenyl) sebacate. A UV absorber that may be used is commercially available and sold under the name Tinuvin 1130.

The stain composition may include certain adjuvants or combinations of adjuvants in order to achieve certain properties. For example, it is contemplated that a filler may be admixed into the stain composition. The filler not only fills the pores of the surface, but also aids in controlling the penetration of the stain composition into the porous substrate. As penetrating properties vary from the various types of wood, a filler may be used to provide surface protection to the target substrate. Without a filler, it is possible that the stain composition will penetrate through the target substrate. An inert filler that is compatible with the stain composition and other adjuvants may be used herein. For example, fumed silica; polymer fillers such as polyethylene and polytetrafluoroethylene; cellulosic fillers; filler clays, such as bentonite clay, kieselguhr earth, and calcium metasilicate, as well as mixtures thereof, may be used. When used, the filler may be present in amount of from 0.01% to 4.0% of the total weight of the stain composition prior to being cured. For example, the filler can be present in an amount of from 0.05% to 0.5%, from 0.4% to 1.5%, or from 1.8% to 3.0% of the total weight of the stain composition prior to being cured.

In order to put the filler into the stain composition, a dispersant may be used. Generally, the dispersant may be present in an amount of from 0.01% to 2.0% by weight, based upon the total weight of the stain composition prior to being cured. For example, the dispersant may be present in an amount of from 0.05% to 0.5%, from 0.4% to 1.3%, or from 1.2% to 1.8% of the total weight of the stain composition prior to being cured. In an embodiment, a commercially available dispersant sold under the name Disperbyk 163 by Byk Chemie may be used.

Also, natural or synthetic insect repellents such as a thiazole, citronella, or cedarwood oil (scent) may be incorporated into the stain composition in effective quantities. Additionally, animal repellents may similarly be incorporated into the mixture. Such repellents include synthetic or natural animal extracts commercially available to repel animals from eating or living in or on treated structures.

Commercially available insecticides may also be incorporated into the stain composition at effective concentrations. For example, the insecticide o,o-diethyl o-(3,5,6-trichloro-2-pyridinyl), marketed by Dow Agro Sciences under the trade name Dursban™ may be included in the stain composition.

A defoamer may be included in the stain composition in order to hinder the formation of foam in the stain composition. A preferred defoamer is commercially available and sold under the name Byk A 530 by Byk Chemie. The defoamer may be present in an amount of from 0.1% to 0.8% based on the total weight of the stain composition prior to being cured. For example, the defoamer may be present in an amount of from 0.125% to 0.25%, from 0.15% to 0.40%, or from 0.3% to 0.7% based on the total weight of the stain composition prior to being cured.

In an embodiment, the stain composition of the present application has high reactivity, which distinguishes it from some other products. However, also unlike certain two-part stain compositions, embodiments of the stain composition disclosed herein are also conducive to stabilization with in-can stabilizers. Accordingly, in an embodiment, to stabilize the composition from premature polymerization, the shelf-life can be lengthened and in-can stability of the stain composition can be improved by adding one or more in-can stabilizers. Genorad *18, Ascinin 0445, and mixtures thereof are preferred in-can stabilizers and can significantly extend the in-can stability of the stain composition. Methyl ether of hydroquinone and volatile proprietary ketoximes stabilize UV activated compositions, such as the present stain composition, by inhibiting free radical generation in acrylates and drying oils. Without suitable levels of in-can stabilizers, the stain composition may gel prematurely rendering it unusable. A three-year shelf life, wherein the composition maintains its physical state without gelling, is possible when the stain composition is stored below 95° F. in the absence of UV light, i.e., packaging the stain composition in a black container impervious to UV and natural light wavelengths. Additionally, purging the stain composition with dry nitrogen increases resistance to premature gelation. In embodiments, the shelf life of the stain composition may be 1 to 5 years, 1.5 to 3.5 years, or 2 to 3 years.

When present, in-can stabilizers can be present in an amount of from 0.5% to 2.5% of the total weight of the stain composition prior to being cured. For example, in-can stabilizers can be present in an amount of from 0.6% to 0.9%, from 0.8% to 1.5%, or from 1.3% to 2.2% of the total weight of the stain composition prior to being cured.

The stain composition eliminates the use of solvents and/or water (which are conventionally used) as viscosity moderating factors in the formulation of wood sealer, preservatives, and stains. For example, solvents and water combined may comprise no more than from 0.01% to 0.3% of the total weight of the stain composition prior to being cured. For example, solvents and water may comprise no more than from 0.02% to 0.1%, from 0.15% to 0.2%, or from 0.75% to 0.25% of the total weight of the stain composition prior to being cured. Previously, sealers, preservatives, and stains have incorporated water and/or solvents, such as mineral spirits, to maintain the formula solids in a liquid state.

In certain embodiments, additional components may be added, although some of these find less usefulness in an EB cured composition. The composition may comprise an unsaturated fatty acid triglyceride oil derived from natural, synthetic, or biologically manufactured fatty acid triglycerides capable of entering into a free-radical initiated polymerization. In an embodiment, this component may be a reactive, unsaturated fatty acid triglyceride oil capable of free radical polymerization with the acrylate-methacrylate mixture. In one embodiment, double boiled linseed oil is used as the unsaturated fatty acid triglyceride oil. In another embodiment, acrylated, epoxidized soybean oil is used. The amount of the unsaturated fatty acid triglyceride oil present in the sealant composition can range from 10% to 25% based on the total weight of the sealant composition prior to being cured. For example, the amount of the unsaturated fatty acid triglyceride oil present in the sealant composition can range from 13% to 20%, 18% to 22%, or 20% to 24% based on the total weight of the sealant composition prior to being cured. The unsaturated fatty acid triglyceride oil may be selected from the group comprising linseed oil, tung oil, castor oil, dehydrated castor oil, safflower oil, soya oil, or cottonseed oil. The most reactive triglycerides have $C_{18}$ to $C_{22}$ chains with higher levels of unsaturation, such as linoleic acid and linolenic acid.

In certain embodiments, additional components may be added to the stain composition. These may be added for specialty applications or currently unforeseen uses. While not needed for an EB cured stain, in an embodiment, a photoinitiator may nonetheless be present, for example, if it is desirable to maximize line speeds. In this case the presence of a photoinitiator will assist the through cure at the accelerated line speed. The photoinitiator which is used in the sealant composition, as noted, can be a single photoinitiator or a blend or mixture of organic photoinitiators. Photoinitiators which are suitable for use in the sealant composition include, carbonyl compounds include ketones, such as 1-phenyl-2-hydroxy-2-methyl-1-propanone; oligo (2-hydroxy-2-methyl-1-phenyl-propan-1-one); oligo (2-hydroxy-2-methyl-1-(4-(methylvinyl) phenyl) propanone); 2-methyl-1-[4-(methylthio)phenyl]-2-(4-morpholinol)-1-propanone; 1-(hydroxycyclohexyl) phenyl ketone and mixtures thereof; acetophenones, such as α,α-dimethoxy-alpha-phenylacetophenone); benzophenones, such as 2,4,6-trimethylbenzophenone; 4-methylbenzophenone, and other such benzophenone derivatives; non-carbonyl-containing photoinitiators, including phosphine oxide and derivatives thereof, such as phenyl bis(2,6 dimethoxybenzoyl) phosphine oxide; (2,4,4-trimethylpentyl)phosphine oxide, as well as mixtures thereof.

The benzophenone derivatives may be aldehyde-substituted benzophenones, cycloalkyl-substituted, or aryl-substituted benzophenones. Furthermore, the substituted component may be further substituted with alkyl or aryl substituents. The phosphine oxide may be similarly substituted.

In an embodiment, the photoinitiator is a combination of photoinitiators. A preferred photoinitiator comprises a mixture of (a) a blend of: (1) bis(2,6-dimethoxybenzoyl)(2,4,4-trimethylpentyl) phosphine oxide; and (2) 1-hydroxycyclohexyl phenyl ketone; (b) 2-methyl-1-[4-(methylthio) phenyl]-2-[4-morpholinyl]-1-propanone, and (c) a mixture or blend of: (1) 2,4,6-trimethylbenzophenone; (2) 4-methylbenzophenone; and oligo(2-hydroxy-2-methyl-1-4-methylvinylphenyl) propanone. These photoinitiator blends are well known and commercially available. Photoinitiators (a) and (b) are sold under the trademarks Irgacure™ 819 and 907, respectively, by BASF Corporation. Photoinitiator (c) is sold by Sartomer under the name Esacure™ KTO 46 and Genocure* TPO-L by Rahn. Another photoinitiator which may be used is sold commercially under the name Irgacure 2022.

Photoinitiators (a), (b), and (c) can be present in weight ratio ranges of 0.5 to 1.0:0.03 to 1.0:0.5 to 1.0, respectively. For example, the ratios of photoinitiators (a), (b), and (c) can be 0.5 to 0.7:0.03 to 0.2:0.6 to 0.8, 0.6 to 0.9:0.1 to 0.5:0.5 to 0.7, or 0.7 to 0.9:0.1 to 0.4:0.8 to 0.9. The photoinitiator may be present in an amount ranging from 0.001% to 2.0% by weight, based upon the total weight of the sealant composition prior to being cured, such as, from 0.001% to 1.0% by weight, based on the total weight of the sealant composition prior to being cured. For example, the photoinitiator may be present in an amount of 0.005% to 0.5%, 0.4% to 1.0%, or 0.8% to 1.9% by weight, based on the total weight of the sealant composition prior to being cured.

It is to be appreciated that the amount of photoinitiator used herein is significantly less than many other compositions in the prior art.

Although it is believed to be unnecessary in an EB cured stain, in an embodiment, a metal catalyst is present in the stain composition and can speed cure rates regardless of the method of initiation. The metal catalyst, may, for example, be an iron-containing or tin-containing catalyst. For example, the metal catalyst may be a 12% active iron complex sold commercially under the name Borchi Oxycoat. Another example metal catalyst is a tin-containing catalyst, dibutylin dilaurate. The metal catalyst reduces the activation energy required to cause copolymerization of the unsaturated fatty acid triglyceride oil with the acrylates and methacrylates in the acrylate-methacrylate mixture. The metal catalyst may be present in an amount of from 0.3% to 1.1% of the total weight of the sealant composition prior to being cured. For example, the metal catalyst may be present in an amount of 0.4% to 0.6%, 0.5% to 0.8%, or 0.7% to 1.0% of the total weight of the sealant composition prior to being cured.

In an embodiment, the EB cured stain is free of or essentially free of any photoinitiators. In an embodiment, the EB cured stain is free of or essentially free of any metal catalyst and/or amine synergist.

Furthermore, in an embodiment, the stain composition may also comprise an amine synergist. A preferred amine synergist is sold commercially under the name Drier Rx.

Another preferred amine synergist is an amine modified polyether acrylate sold commercially under the trade name Sartomer CN501. Like the metal catalyst, the amine synergist reduces the activation energy required to cause polymerization of the unsaturated fatty acid triglyceride oil with the acrylates and methacrylates of the acrylate-methacrylate mixture. The amine synergist may be present in an amount of from 0.12% to 0.72% of the total weight of the sealant composition prior to being cured. For example, the amine synergist may be present in an amount of from 0.13% to 0.25%, from 0.2% to 0.5%, or from 0.4% to 0.7% of the total weight of the sealant composition prior to being cured.

In an embodiment, the stain composition is both essentially organic-solvent-free as well as essentially water-free, rendering the stain composition substantially 100% solids with the exception of any scent oils, insect repellents, UV absorbers, or dyes/pigments. In an embodiment, the stain composition contains no purposefully added solvents or water. In an embodiment, the stain composition excludes photoinitiators, other cure initiators, water, and/or unsaturated oils. In an embodiment, the stain composition is a "single-component," which as known to those of ordinary skill in the art means that the individual elements of the sealant composition are combined and mixed together prior to use, such as at the time of synthesis, such that the sealant composition can be stored and delivered in a single container and requires no mixing of additional components or an activating agent at the time of use. As used herein, the term "essentially 100% solids" means that the thickness of the (wet) sealant composition when first applied (measured in units of length, e.g. millimeters) to a surface does not change appreciably after the sealant composition has finished drying on a surface. The test used to determine percent solids is American Society for Testing and Materials International (ASTM) D1259 "Standard Test Methods for Non-volatile Content of Resin Solutions."

Performance testing is a means by which to quantify the effect of the specific EB curtain apparatus settings on the performance properties produced within the polymerizable stain. Additional attributes of the polymerizable stain composition have a direct effect too. Dynamic viscosity is a measure of the thickness of the polymerizable stain and relates to degree of penetration; it is measured in mPa-sec which is essentially equivalent to centipoise when density is considered to be essentially identical amongst compositions. Differential scanning calorimetry (DSC) validates curing behavior. DSC scans produce exothermal peaks which are used to analyze onset temperature which directly correlates with degree of through cure. Forward and backward scrubs, known as double rubs employ the use of a white cloth saturated with methyl ethyl ketone (MEK). After 100 double rubs the cloth is accessed for color removal. Cross Hatch adhesion quantifies the bond of a stain, coating or paint to the wood plank surface which quantifies the number of squares which are removed from a 100-square grid using specific adhesive strength tape in a rapid pull of at a low angle to the treated surface. Accelerated weathering is performed in various ways; most commonly a chamber which produces cycles of UVA or UVB irradiation combined with condensing humidity mimic daylight sun exposure at a 45 degree angle to the sun, followed by cooling and condensing nighttime exposures. Q-Panel Company in Cleveland, Ohio provides an accelerated weathering test machine for this purpose. In order to quantify changes in the performance of the treated wood planks an initial color reading is taken. Upon completion of the testing a secondary color reading is taken and compared with the initial reading.

Determination of the mathematical difference in three coordinate light space between initial and final readings is calculated. Specifically, the $\Delta L^*$, $\Delta a^*$, $\Delta b^*$ relates to a measure of the stain or coatings lightness-darkness, chromaticity or hue and saturation translated into a three dimensional color space or sphere.

A dynamic (shear) viscosity of the stain composition may be 75 to 950 cps, such as, for example, 100 to 750 cps, or 150 to 300 cps. Dynamic (shear) viscosity was determined with a Brookfield type viscometer using ASTM D2196 "Standard Test Methods for Rheological Properties of Non-Newtonian Materials By Rotational Viscometer." In an embodiment, the wood surface may be permeated by composition, both pre-cure and post-cure at least 0.1 inches, such as 0.15 to 0.35, or 0.2 to 0.25 inches.

Without being bound by theory, it is believed that the penetrating acrylate resins of the sealant composition act to stabilize lignin by immersing the lignin and other wood components and structures in a liquid resin, which then becomes a solid polymer. The resulting polymer is formulated to be resistant to environmental damage, such as UV and biological attack. The acrylate resins enter the porous substrate by the same means that water and waterborne biological agents do and then solidifies (polymerizes) in and throughout the porous substrate, thereby occupying, obstructing, and reducing the channels by which subsequent waterborne agents may enter the substrate. Thus, freeze-thaw damage is reduced by reducing the substrate's permeability to water. Further, fungal infestation and subsequent damage from waterborne fungal agents is reduced.

As the stain composition is absorbed deep into the wood, it provides a deeper penetration and longer term protection against weathering, erosion, and fungal attack. In essence, upon curing, the sealant composition becomes part of the cellular structure of the wood itself. The faster EB curing technique promotes a full and deep cure quickly.

In an embodiment, the composition comprises: (a) an acrylate-methacrylate mixture that can undergo a polymerization reaction, the acrylate-methacrylate mixture comprising at least an acrylate and at least a methacrylate, the acrylate having a lower molecular weight than the methacrylate, wherein the methacrylate contains allyl or other conjugated unsaturation and multi-functionality for improved surface cure; (b) a functionalized resin having functionality greater than 2 and a dynamic (shear) viscosity of between 1,000 to 100,000 centipoise, such as an oligomeric (meth)acrylate functionalized urethane, polyester, epoxy, or siloxane; (c) an unsaturated fatty acid triglyceride oil capable of entering into a free-radical initiated polymerization; and (d) a mixture of organic and/or inorganic photoinitiators which initiates the polymerization reaction upon exposure of the sealant composition to UV light or electron beam. The sealant composition may further comprise (e) a metal catalyst and (f) an amine synergist. The metal catalyst and amine synergist reduce the activation energy required to cause copolymerization of the unsaturated fatty acid triglyceride oil with the acrylate-methacrylate mixture. Furthermore, the sealant composition may further comprise: (g) ultraviolet light absorbers and HALS for enhanced durability; (h) a blend of fillers, pigments, and/or dyes for imparting special colors to the sealant composition; and (i) specialized organic or inorganic additives, such as fungicides, mold growth inhibitors, insect replants, flow and leveling agents, defoamers, and/or fragrance, which impart certain characteristics to the sealant composition.

In an embodiment, the composition can also be exposed to some source of light for at least some amount of time in order to effectuate a controlled cure. Specifically, UV light within natural sunlight can bring about a tack-free cure of the sealant composition within a short time. As discussed below, a UV absorber may be employed to control the rate of the polymerization reaction and, secondarily, to enhance components in the wood which are susceptible to damage from UV light.

The acrylate-methacrylate mixture may be present in an amount of 50% to 81% of the total weight of the sealant composition prior to being cured. For example, the acrylate-methacrylate mixture may be present in an amount of 55% to 70%, 60% to 80%, or 70% to 75% of the total weight of the sealant composition prior to being cured. The acrylate and methacrylate may be present in a weight ratio ranging from 9:1 to 2:1. For example, the ratio of the acrylate to the methacrylate can be from 9:1 to 7:1, from 8:1 to 4:1, or from 5:1 to 3:1.

The acrylate-methacrylate mixture used herein can comprise at least an acrylate oligomer of essentially low molecular weight having functionality of greater than 2 and a methacrylate oligomer of essentially low molecular weight having functionality of greater than 2. The acrylate-methacrylate mixture may also contain additional acrylate and methacrylate monomers or oligomers with functionality of essentially 1 or greater to modify viscosity, overall functionality, flexibility, and the degree of crosslinking.

As used herein, the term "functionality" when applied to a monomer means the number of reactive groups in the monomer available for polymerization. When applied to a resin, oligomer, or polymer, the term "functionality" refers to the units of unsaturation present in the resin available for free radical reaction calculated as a number average. In an embodiment, the functionality are units of unsaturation, such as double bonds in the resin. When functionality is greater than 2, three-dimensional cross linking can occur with the resin chains.

The acrylate and the methacrylate of the mixture and the additional acrylate or methacrylates added for viscosity, flexibility, and crosslinking may be selected from commercially available unsaturated acrylic esters and methacrylic esters, such as (meth)acrylic oligomers, mono-(meth)acrylates, di-(meth)acrylates, tri-(meth)acrylates, urethane (meth)acrylates, polyester or polyether (meth)acrylates, epoxy (meth)acrylates, and mixtures thereof. Mixtures of acrylic and methacrylic resins may define the acrylate and the methacrylate, respectively.

Suitable representative acrylates and methacrylates in monomer or oligomer form that may be used in the sealant composition include, for example, polyurethane acrylic, trimethylolpropane triacrylate, 1,6-hexanediol diacrylate, ethoxylated and propoxylated versions of said acrylics, aliphatic urethane acrylates, aromatic urethane acrylates, allyl functional aliphatic urethane acrylate, epoxy acrylics such as ethoxylated Bisphenol A diacrylates, polyester polyol acrylates, acrylated polysiloxanes, acrylated amines and their oligomers, isobornyl acrylate, allyl acrylate and conjugated allyl functionalized dimethacrylates, tetrahydrofurfyl acrylate, 2-phenoxyethyl acrylate, multifunctional acrylic esters of functionality greater than 2, and the corresponding methacrylate versions of the above referenced acrylates. Pentaerythritol acrylate and pentaerythritol tetraacrylate monomers can be particularly useful in the sealant composition.

The acrylate-methacrylate mixture in the sealant composition is employed for both viscosity control as well as for regulating the degree of penetration of the sealant composition into a porous substrate. Moreover, the methacrylate contains allyl functionality that enables it to utilize molecular oxygen in formation of peroxy radicals which further react to enhance surface cure.

The sealant composition may further comprise a functionalized resin having functionality greater than 2 and a dynamic (shear) viscosity of 1,000 to 100,000 centipoise, such as 2,500 to 15,000 cps, or 5,000 to 12,000 cps. Suitable functionalized resins may include an oligomeric (meth) acrylate functionalized urethane, polyester, epoxy, or siloxane. In an embodiment, the functionalized resin is an oligomeric (meth)acrylate isocyanate-containing urethane oligomer with 5% to 12% free isocyanate reactive sites, such as, 6% to 11%, or 7% to 10%. In an embodiment, the functionalized resin exhibits dual cure properties, meaning that it cures both with UV light and also secondarily with moisture in shadowed areas. A functionalized resin that can be used in the sealant composition is an oligomeric (meth) acrylate isocyanate-containing urethane oligomer with 5% to 12% free isocyanate reactive sites sold commercially under the name Sartomer CN9302. Sartomer CN9302 has a dynamic (shear) viscosity of 8,500 centipoise at 25° C. This component helps to increase cure time performance, especially when light exposure is limited. The resin having a functionality of greater than 2 allows for three-dimensional crosslinking.

The functionalized resin can be present in an amount of from 4% to 12% of the total weight of the sealant composition prior to being cured. For example, the functionalized resin can be present in an amount of 5% to 8%, 6% to 10%, or 8% to 11% of the total weight of the sealant composition prior to being cured.

The acrylate-methacrylate mixture, the functionalized resin, and the unsaturated fatty acid triglyceride oil provide chemical and physical characteristics to the composition that enhance resistance to damage from environmental and biological agents. EB curing radiation is much stronger than UV curing radiation and overcomes surface inhibition. However, a fatty acid triglyceride still can function as a flexibilizer for the stain which is desirable. Conjugated unsaturation in the form of an allyl moiety combined with multi-functional methacrylate sites within the same monomer enables coordination with molecular oxygen to form a peroxy compound in-situ, thus releasing free radical species capable of initiating polymerization at the foremost surface of the wood. The unsaturated fatty acid triglyceride oil's unsaturation enters into the free radical reaction with the acrylates in the acrylate-methacrylate mixture, creating an essentially completed crosslinked matrix.

While unnecessary in an EB cured stain composition, in other embodiments, an unsaturated fatty acid triglyceride oil chains impart a modest amount of flexibility, but more specifically aid in driving the free radical polymerization essentially to completion. The presence of a metal catalyst along with an amine synergist speeds up the rate of cure and attainment of an essentially tack-free surface. During periods of shade or darkness a significant reduction to the UV radiative intensity takes place. The incorporation of an isocyanate capped urethane oligomer further improves surface cure by reacting with water molecules in the air regardless of decreased UV radiation.

In an exemplary method for manufacturing the stain composition, the polymerizable oligomers, monomers, and other components are dispersed or mixed together at ambient conditions and at high shear until the stain composition is homogeneous.

In an embodiment, after mixing, the stain composition is allowed to stand for a sufficient time to permit the release of entrapped air prior to weighing and packaging. The shelf-life of the stain composition is enhanced by packaging under dry nitrogen gas. After mixing the stain composition, it is filtered and allowed to stand to release any entrapped air due to the high shear mixing process.

The stain composition is storage stable without evidencing any separation or settling of the acrylic components over an extended period of time. Typically, if there is any component settling of the inert filler(s) and pigments, the sealant composition can be rendered homogeneous with manual stirring prior to application.

To achieve optimal aesthetics of the wood, the stain composition is applied to a clean, weathered, exterior wood surface which has been treated and scrubbed to remove any aged, discolored, or damaged surface material. It must be appreciated that most exterior porous surfaces, not only wood, are susceptible to infestation and discoloration from biological agents as well as waterborne and airborne dirt. Therefore, this cleaning process is not limited to wood surfaces, but any exterior porous surfaces that are susceptible to infestation and discoloration from biological agents as well as waterborne and airborne dirt. This cleaning process optimizes the final aesthetics of the exterior wood surface, but is not vital to the efficacy of the stain composition. Furthermore, the stain composition can be applied to a substantially dry surface having been allowed to dry for about 48 hours from last having been exposed to water.

A method of preparing and cleaning weathered, exterior wood surfaces of both sun damaged and physically damaged wood in preparation for coating with the stain composition can be a single step or a two-step process. Generally, as a first step, the process comprises applying a bleaching (or oxidizing) agent to the construction material or substrate and an optional second step comprising applying an acidic agent. The application may be achieved by any suitable method such as spring, rolling, or brushing. As noted below, the preparation process may comprise solely the application of the bleaching agent.

The bleaching agent serves a three-fold purpose, i.e., as an anti-biological agent, a bleaching agent, and a cleaning agent. First, the bleaching agent serves to kill fungal, bacterial, and other bio-forms on and in the wood surface. Secondly, the bleaching agent functions to render bio-forms colorless while promoting the bleaching of other wood stains. Third, the bleaching agent aids in the dissolving and the removing of UV damaged wood components. The effective dwell time which renders the bleach effective is directly dependent upon the type and concentration of the bleaching agent and the ambient temperature of the substrate and bleaching agent. This typically varies from as little as less than one minute to as long as several hours prior to neutralization or rinsing with water. If used as a stand-alone treatment, the bleaching agent is rinsed off with (preferably) pressurized water with or without manual scrubbing of the surface. Suitable pressurized water, such as from a typical garden hose, is sufficient to wash away the bleaching agent and debris.

When the bleaching step is followed by an acid treatment step, then the rinsing away of the bleaching agent with water is optional and is not necessary. The direct application of the acidic agent over the bleaching agent is an acceptable practice.

The bleaching step may be used independently of any other preparation for using the sealant composition and does not require a follow-on acid treatment. However, an acid treatment step has been found to be effective in both neutralizing the bleaching agent and in suppressing a bleaching appearance by promoting the development of the natural colors inherent in the wood.

Thus, the acid treatment step (second step) serves to at least partially neutralize the alkaline bleaching agent, promote the development of the wood's inherent natural colors, and wash away any remaining debris which may be acid soluble. The effective dwell time which renders the acidic agent effective is directly dependent upon the type and concentration of the acidic agent, the concentration and type of the bleaching agent to be neutralized, and the ambient temperature of the substrate and acidic agent. This dwell time typically varies from as little as less than one minute to as long as several hours prior to rinsing with water (physically scrubbing the surface is optional). Ordinarily, it is not effective to use the acidic agent as a stand-alone treatment. The acidic agent is rinsed off with (preferably pressurized) water with or without manual scrubbing of the surface to aid in removing surface debris. Suitable pressurized water, such as from a typical garden hose, is sufficient to wash away the acidic agent and debris.

It is to be appreciated that the two-step preparatory treatment eliminates the need to pressure wash exterior wood surfaces prior to application of the stain composition. Previously, it was typically required to pressure wash exterior wood surfaces to remove damaged surface wood and stains prior to sealing. The present two-step process enables optimal results with the stain composition while eliminating the need for costly pressure washing. Further, if it is opted to pressure wash wood surfaces along with the present two-step preparation, care must be taken not to damage the surface with excessive blasting force from the pressure wash nozzle.

Bleaching agents which may be used include an aqueous solution of effective concentration selected from the group consisting of chlorinated and non-chlorinated bleaching agents, such as sodium metasilicate, sodium sesquicarbonate, or sodium hypochlorite. Such aqueous bleaching solution may comprise a blend of suitable bleaching agents.

The acidic agent may be an aqueous solution of an effective concentration of organic acids selected from the group consisting of oxalic acid, succinic acid, and/or boric acid, as well as mixtures thereof.

The single or two-step preparation is not necessary in all embodiments, such as for a new, unstained surface.

The stain composition can be applied in any suitable manner such as by spray, brush, or roller, or others disclosed herein. When sprayed, a homogeneous mixture issues from the nozzle of the spray equipment. "Homogeneous" is understood to mean that the composition of each droplet in the issued spray is substantially of the same composition of that from the reservoir from which the material to be sprayed was drawn. Because of the nature of the sealant composition, the sealant composition is able to permeate a porous substrate until the substrate is saturated. However, total saturation is not required. It is only required that the outer surface of the wood be treated, with deeper protection being achieved as more of the sealant composition is absorbed, until full saturation occurs.

The stain composition is then subjected to the EB curing as disclosed herein. For example, the stain composition can be applied by automated manufacturing processes to generate pre-stained decking fully cured under EB irradiation; for instance, at line speeds of, e.g., 10 and 300 m/min, such as 150 to 250 m/min, or 200 to 225 m/min; or 100 to 500 ft/min, such as 200 to 300 ft/min, or 250 to 350 ft/min.

Consequentially, the sealant composition exhibits significantly improved surface tack-free cure denoted by fast line speeds producing not only no discernible tackiness at the surface of the finished stained wood decking, but rather a full 99.9% plus cure. This enables immediate shipping and packaging of the materials after curing, greatly enhancing the total time required to get the materials to the customer.

The stain composition offers significant advantages over conventional UV curable wood coatings, especially in light of near immediate full curing rates achievable on automated production lines. These advantages encompass rapid through-cure with no photoinitiators or other traditional cure agents, full cure with ability to package and ship immediately, realtively uniform penetration of the stain composition into the decking due to significantly reduced viscosity, and excellent resistance to chipping, peeling, and flaking.

Not all embodiments disclosed herein must possess the characteristics discussed above. Furthermore, the claims are not to be limited by any such characteristics discussed herein unless recited in the claim itself.

The examples disclosed below further describe the technology. The examples also illustrate useful methodology for practicing the technology. The examples do not limit the claims. In the examples, all parts are by weight absent indications to the contrary.

EXAMPLES

In the preparation of the example compositions 1-8, all of the components were mixed together in a vessel equipped with a high shear dispersion blade. The oligomers and monomers were first loaded into the mixing vessel and mixing began. Then the pigment tint dispersion was added and mixed thoroughly for 20 minutes. Finally, additives and photoinitiators were added. Mixing was conducted at moderate speed (2000 to 4000 fps peripheral blade tip speed) until homogeneous. Thereafter, the example compositions were mixed at high shear for about thirty-five minutes while maintained at approximately 1800 rpm. Thereafter, example compositions were filtered through a So-Clean filter vessel equipped with a 50 μm rated bag filter into a plastic container. Then, the compositions were allowed to stand for a sufficient time to permit the release of entrapped air prior to weighing and packaging. The shelf-life of the compositions was enhanced by packaging under dry nitrogen gas introduced under positive pressure in order to displace headspace oxygen and moisture. The examples were then ready for use with porous materials, including exterior and interior wood or suitable porous substrates of natural or synthetic compositions, such as wood laminates, and pressed board.

The stain composition was then applied to different types of porous wood substrates, and then subjected to testing including accelerated weathering in a Cleveland Q-Panel QUV condensation cabinet. Additional testing was also conducted. The following delta E*ab values were obtained after 700 hours of QUV exposure using ASTM D 4587, Cycle 2 test protocol.

Examples 1-7

Examples 1 through 7 are examples of the composition used on pine wood planks with EB curing. Table 1 shows the formula of the compositions. Table 2 shows the conditions of curing and the properties of the final product.

The pine planks were coated with a stain composition of Examples 1-7. Then they were moved into an EB curtain apparatus, where they were dosed with the ionizing radiation. Details of such are in Table 2. For a second pass the planks were again loaded into the EB curtain a second time with the same dosing shown in Table 2. Then the treated planks were put into the accelerated weathering test machine.

These examples illustrate the effect electron beam irradiation has on polymerizable monomers and oligomers applied to wood planks. The oligomers include an aliphatic urethane acrylate and a siliconized urethane acrylate and are further formulated with monomers and other components in quantities sufficient to achieve a low viscosity range of 100 to 500 centipoise.

TABLE 1

| | Examples 1 through 7 Formulation | | | | | | |
|---|---|---|---|---|---|---|---|
| | 1 | 2 | 3 | 4 | 5 | 6 | 7 |
| Siliconized urethane acrylate CN9800 | 12.00 | 6.00 | 4.00 | 15.00 | 7.00 | 4.00 | 12.00 |
| Aliphatic urethane acrylate PU320 | 0.00 | 6.00 | 8.00 | 0.00 | 8.00 | 11.00 | 0.00 |
| Trimethylolpropane triacrylate (TMPTA) | 51.00 | 50.00 | 49.00 | 45.00 | 44.00 | 43.00 | 28.00 |
| DBLO | 0.00 | 0.00 | 0.00 | 0.00 | 0.00 | 0.00 | 0.00 |
| Allyl dimethacrylate (Sartomer SR523) | 5.00 | 5.00 | 5.00 | 5.00 | 5.00 | 5.00 | 5.00 |
| Pentaerythritol ethoxylated acrylate (Miramer M4004) | 3.00 | 3.00 | 3.00 | 3.00 | 3.00 | 3.00 | 3.00 |
| GENORAD *18 (in can stabilizer) | 0.00 | 0.00 | 0.00 | 0.00 | 0.00 | 0.00 | 0.00 |
| BDT-1006 dendritic, multi-functional acrylate | 6.00 | 6.00 | 6.00 | 6.00 | 6.00 | 6.00 | 6.00 |
| BDT-1015 dendritic, multi-functional acrylate | 3.00 | 3.00 | 3.00 | 3.00 | 3.00 | 3.00 | 0.00 |
| CN303 Poly-BDDMA | 5.00 | 5.00 | 5.00 | 5.00 | 5.00 | 5.00 | 5.00 |
| JAYLINK JL-106E-10% (cellulose polymer that has been acrylated) | 0.00 | 0.00 | 0.00 | 0.00 | 0.00 | 0.00 | 20.00 |
| C.B. TINT | 7.50 | 7.50 | 7.50 | 7.50 | 7.50 | 7.50 | 7.50 |
| TINUVIN 1130 (UV absorber) | 2.00 | 2.00 | 2.00 | 2.00 | 2.00 | 2.00 | 2.00 |

TABLE 1-continued

Examples 1 through 7 Formulation

|  | 1 | 2 | 3 | 4 | 5 | 6 | 7 |
|---|---|---|---|---|---|---|---|
| TINUVIN 292 (hindered amine light stabilizer) | 2.00 | 2.00 | 2.00 | 2.00 | 2.00 | 2.00 | 2.00 |
| BUSAN 1498 (fungicide) | 1.20 | 1.20 | 1.20 | 1.20 | 1.20 | 1.20 | 1.20 |
| BYK-A 530 (defoamer) | 0.30 | 0.30 | 0.30 | 0.30 | 0.30 | 0.30 | 0.30 |
| COBALT 12% | 1.00 | 1.00 | 1.00 | 1.00 | 1.00 | 1.00 | 1.00 |
| TOTALS | 100.00 | 100.00 | 100.00 | 100.00 | 100.00 | 100.00 | 100.00 |

TABLE 2

Conditions of Curing and Properties of Cured Product

| | | | | | | | |
|---|---|---|---|---|---|---|---|
| Dynamic Viscosity, mPa-sec | 330 | 250 | 225 | 440 | 400 | 375 | 490 |
| Degree of Cure, DSC | >99.9 | >99.9 | >99.9 | >99.9 | >99.9 | >99.9 | >99.9 |
| Electron Beam (MeV) | 3.8 | 3.8 | 3.8 | 3.8 | 3.8 | 3.8 | 3.8 |
| Dose, Mrad/pass | 2.106 | 2.106 | 2.106 | 2.106 | 2.106 | 2.106 | 2.106 |
| Number of Passes | 2 | 2 | 2 | 2 | 2 | 2 | 2 |
| Electron Beam (mA) | 42 | 42 | 42 | 42 | 42 | 42 | 42 |
| Feet per Minute (FPM) | 48 | 48 | 48 | 48 | 48 | 48 | 48 |
| 100 MEK Double Rubs, % Removed | <0.03 | <0.05 | <0.05 | <0.01 | <0.05 | <0.05 | 0 |
| Cross Hatch Tape-Off, % of 100-square grid | 0 | 0 | 0 | <0.1 | <0.1 | <0.2 | 0 |
| ΔE*ab QUV Rating, 1000 hours total exposure | 15.3 | 22.3 | 22.4 | 22.3 | 29.4 | 22.1 | 13.7 |

* 1000 hours QUV exposure of field applied, conventional cure coatings exhibit a ΔE*ab of ≥40 units The QUV weathering results are indicative of extended durability and performance relative to traditional field applied wood deck stains. The control exerted by the EB irradiation process is responsible for delivering essentially 100% through cure as determined by DCS scans.

Example 8: Comparative Example for UV Cure Testing on Wood Planks

Example 8 is a comparative example of the composition used on pine wood planks with a composition designed for UV curing and that is UV cured.

| Example 8: CLEAR STAIN | |
|---|---|
| URETHANE OLIGOMER | 12.00 |
| Trimethylolpropane triacrylate (TMPTA) | 63.6 |
| ETHOXYLATED TMPTA | 12.0 |
| ISOBORNYL ACRYLATE | 5.0 |
| Pentaerythritol ethoxylated acrylate (Miramer M4004) | 2.0 |
| GENORAD *18 (in can stabilizer) | 1.5 |
| TINUVIN 1130 (UV absorber) | 1.00 |
| TINUVIN 292 (hindered amine light stabilizer) | 1.00 |
| BUSAN 1498 (fungicide) | 1.20 |
| BYK-A 530 (defoamer) | 0.30 |
| Photoinitiator, Type I | 0.05 |
| Photoinitiator, Type II | 0.35 |
| TOTALS | 100.00 |

After 100 MEK double rubs on the cured plank, approximately 25% of the top surface was removed.

The depth of penetration and through cure directly correlate with performance and durability. The ability of a polymeric stain to adsorb onto a wood plank's surface and absorb into the wood will ultimately determine the depth of penetration. Initial adsorption is affected mainly by the viscosity of the polymeric stain while absorption will also be dependent upon the diffusion characteristics of the polymeric stain within the interstices of the wood and its affinity for the wood, i.e., the similarity in organic structure and polarity of the molecules. EB irradiation of the treated wood planks ensures essentially 100% through cure to full depth of the stain.

Example 9: Optical Microscopy Tests of Example 7 and Pigmented Variant

Optical Microscopy was employed to further substantiate the effectiveness of EB irradiation on cure. The stereomicroscopic photos of the prestained wood planks cured with an optimized EB dose are shown in FIGS. 1-4. The cured planks were cut lengthwise on a wood saw exposing the center of the wood halves. All observations were taken on an Olympus SZ61-400X Stereomicroscope with external adjustable light arms. A pure white background was first calibrated so that the actual colors are true. One half of each sample was mounted side cut upward at a time and secured to the base of the Olympus Stereomicroscope.

Figure 2:
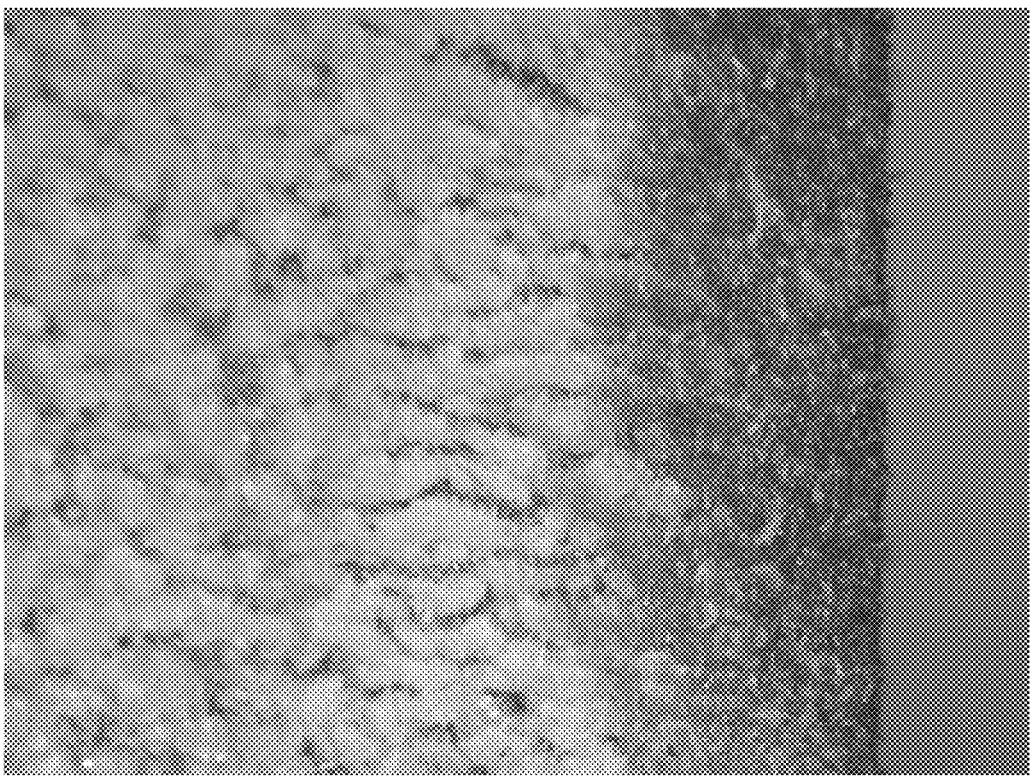
FIG. 2 is a 200× microscopic view of a cross-section showing a wood plank treated with Example 7 (clear with red dye).
Figure 3:
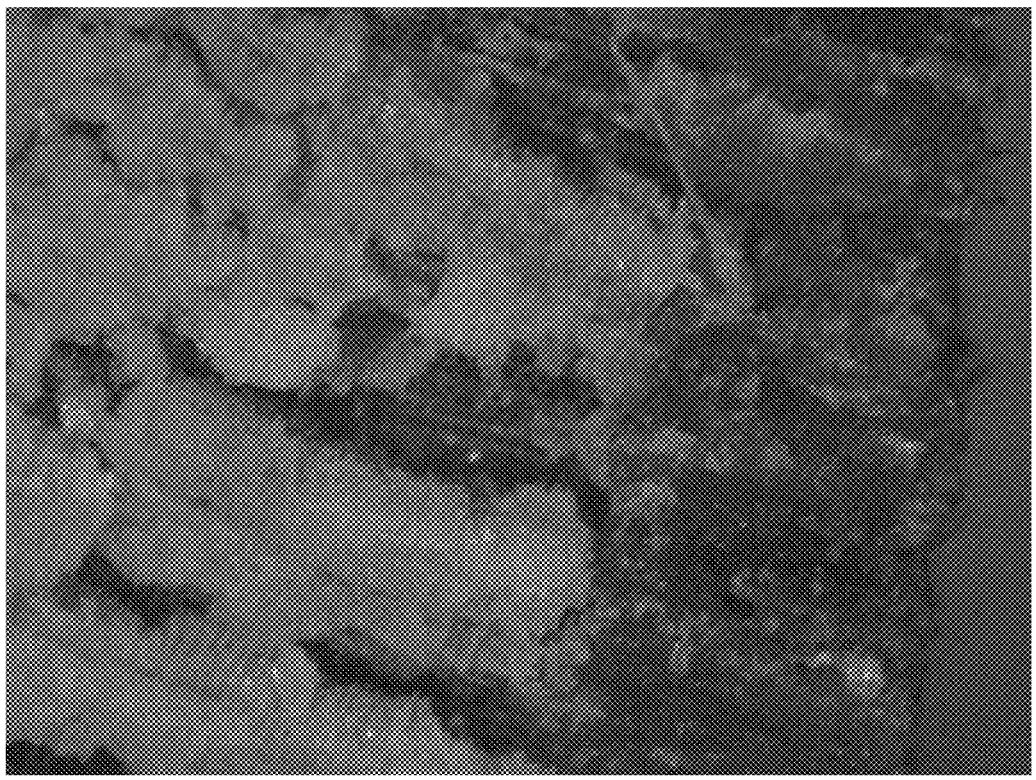
FIG. 3 is a 400× microscopic view of a cross-section showing a wood plank treated with Example 7 (clove brown pigment).
Figure 4:
FIG. 4 is a 400× microscopic view of a cross-section showing a wood plank treated with Example 7 (clear with red dye).

FIG. 1 is a 200× microscopic view of a cross-section showing a pine wood plank treated with Example 7 (clove brown pigment), and FIG. 2 is a 200× microscopic view of a cross-section showing a pine wood plank treated with Example 8 (clear with red dye). FIG. 3 is a 400× microscopic view of a cross-section showing a pine wood plank treated with Example 7 (clove brown pigment), and FIG. 4 is a 400× microscopic view of a cross-section showing a pine wood plank treated with Example 8 (clear with red dye). EB curing has no effect on depth of penetration of the stains; this is governed by the stain composition. However, EB curing provides full depth curing whereas UV curing is hindered by pigmentation and usually will not facilitate full depth curing on highly pigmented stains.

FIGS. 1-4 show two colors; specifically Clove Brown and Clear with Red Dye which represents Example 7 with and without translucent tint. The Clove Brown treated sample exhibited a nominal ¼ inch to 5/16 inch depth of penetration. Conversely, Clear with Red Dye exhibited slightly greater readings averaging 5/16 inch to 7/16 inch.

Example 7 has a unique molecular resin structure which has a strong affinity for wood, so it is this combination of low viscosity, high adsorption and excellent diffusion characteristics that allows it to penetrate to ¼ inch and deeper. Furthermore, EB irradiation ensures essentially 100% through cure. Example 7 with translucent tint penetrates to a similar depth, although the through cure only approaches 75% as measured by the MEK Double Rubs test. These examples show the ability of EB curing to promote "full-depth" cure in pigmented stains, UV curing cannot approach this depth of cure, particularly in pigmented stains.

What is claimed is:

1. A method for producing a cured wood plank, comprising:
   applying a composition to a surface of the wood plank, the composition comprising a polymerizable oligomer, monomer, or both;
   irradiating the surface of the wood plank with the composition with ionizing radiation from an electron beam sufficient to polymerize the polymerizable oligomer or monomer;
   wherein the composition has a dynamic viscosity of 100 to 500 centipoise as measured by ASTM D2196.

2. The method of claim 1, wherein the ionizing radiation is from an electron beam curtain apparatus.

3. The method of claim 2, further comprising flushing a gap with an inert gas between an ionizing radiation source and the surface of the wood plank.

4. The method of claim 1, wherein the wood plank receives a dose of 5 kGy to 100 kGy.

5. The method of claim 2, further comprising conveying the wood plank through the electron beam curtain apparatus on a conveyor belt.

6. The method of claim 1, further comprising irradiating the surface of the wood plank with the composition multiple times.

7. The method of claim 5, wherein a line speed of the conveyor belt is 100 to 300 m/min.

8. The method of claim 7, wherein a degree of cure is at least 97% immediately after exiting the electron beam curtain apparatus, as determined by differential scanning electron microscopy.

9. The method of claim 2, wherein an acceleration voltage of the electron beam is 80 kV to 300 kV.

10. The method of claim 1, wherein the composition is applied to the wood plank surface at a thickness of 0.001 to 50 microns.

11. The method of claim 1, wherein after irradiating the wood plank and composition, the composition permeates the surface of the wood plank at least 0.1 inches down from the surface.

12. A composition for application to a wood plank, comprising:
    a polymerizable oligomer or monomer, or both;
    wherein composition has a dynamic viscosity of 100 to 500 centipoise as measured by ASTM D2196,
    wherein the composition is free of or essentially free of any photoinitiators.

13. The composition of claim 12, wherein the polymerizable oligomer is an aliphatic urethane acrylate, a siliconized urethane acrylate, or both.

14. The composition of claim 12, wherein the polymerizable oligomer is one or more of the following chemical compounds in oligomeric form: acrylated or methacrylated urethane, polyester, siloxane, epoxide, melamine, butadiene, cellulose, dendritic species with at least one functionally reactive molecule, vinyl ethers, or cationic resins.

15. The composition of claim 12, wherein the polymerizable monomer is one or more of the following chemical compounds: aliphatic hydrocarbon, cycloaliphatic hydrocarbon, aromatic hydrocarbon, ethoxylate, propoxylate, acrylate and methacrylate; or chemical compounds with functional moieties selected from: bicyclic, heteroatomic, multifunctional, allylic, dendritic species with at least one functionally reactive molecule, and metal-ligands.

16. The composition of claim 12, further comprising a plasticizer wherein the plasticizer is one or more of a phthalate ester, a phosphate ester, and a sulfonated or ethoxylated polymer.

17. The method of claim 1, further comprising a plasticizer wherein the plasticizer is one or more of a phthalate ester, a phosphate ester, and a sulfonated or ethoxylated polymer.

18. The method of claim 1, wherein the composition comprises: an acrylate-methacrylate mixture, the acrylate-methacrylate mixture comprising at least an acrylate oligomer and at least a methacrylate oligomer, the acrylate oligomer having a lower molecular weight than the methacrylate oligomer.

19. The method of claim 18, wherein the composition is a single-component sealant composition and is not mixed with an activating agent.

20. A method for producing a cured wood plank, comprising:
    applying a composition to a surface of the wood plank, the composition comprising a polymerizable oligomer, monomer, or both;
    irradiating the surface of the wood plank with the composition with ionizing radiation from an electron beam sufficient to polymerize the polymerizable oligomer or monomer;
    wherein after irradiating the wood plank and composition, the composition permeates the surface of the wood plank at least 0.1 inches down from the surface.

* * * * *